(12) United States Patent
Yamaguchi et al.

(10) Patent No.: US 8,438,563 B2
(45) Date of Patent: May 7, 2013

(54) RECORDING MEDIUM RECORDING THEREON VIRTUAL MACHINE MANAGEMENT PROGRAM, MANAGEMENT SERVER DEVICE, AND METHOD FOR MANAGING VIRTUAL MACHINE

(75) Inventors: Hiroyuki Yamaguchi, Kawasaki (JP); Takashi Maeda, Kawasaki (JP); Yuta Kojima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 862 days.

(21) Appl. No.: 12/409,556

(22) Filed: Mar. 24, 2009

(65) Prior Publication Data

US 2009/0249334 A1    Oct. 1, 2009

(30) Foreign Application Priority Data

Mar. 31, 2008 (JP) .................................. 2008-93079

(51) Int. Cl.
*G06F 9/455* (2006.01)
*G06F 1/00* (2006.01)

(52) U.S. Cl.
USPC ............................... 718/1; 713/300; 713/330

(58) Field of Classification Search ........................ None
See application file for complete search history.

(56) References Cited

U.S. PATENT DOCUMENTS

| | | | |
|---|---|---|---|
| 5,713,027 A | 1/1998 | Soejima et al. | |
| 5,717,934 A | 2/1998 | Pitt et al. | |
| 5,867,716 A | 2/1999 | Morimoto et al. | |
| 7,249,174 B2 * | 7/2007 | Srinivasa et al. | 709/223 |
| 2003/0233431 A1 * | 12/2003 | Reddy et al. | 709/221 |
| 2004/0199599 A1 | 10/2004 | Nichols et al. | |
| 2004/0230687 A1 * | 11/2004 | Nakamura et al. | 709/228 |
| 2005/0278700 A1 | 12/2005 | Buskens et al. | |
| 2008/0104217 A1 * | 5/2008 | Srinivasa et al. | 709/223 |
| 2010/0325628 A1 | 12/2010 | Haga et al. | |

FOREIGN PATENT DOCUMENTS

| | | |
|---|---|---|
| JP | 06-250858 | 9/1994 |
| JP | 7-334466 | 12/1995 |
| JP | 2001-005679 | 1/2001 |
| JP | 2004-523048 | 7/2004 |
| WO | WO 02/071215 | 9/2002 |

OTHER PUBLICATIONS

Sapuntzakis et al. (Sapuntzakis) (Virtual Appliances for Deploying and Maintaining Software): LISA '03: pp. 181-194, 2003.
Office action issued in U.S. Appl. No. 12/409,603, mailed Apr. 6, 2012.
Japanese Office action issued in corresponding JP App. No. 2008-093079 issued Apr. 3, 2012.
Decision of Refusal issued by the Patent Office of Japan for corresponding Japanese Patent Application No. 2008-093079, mailed Mar. 5, 2013.

* cited by examiner

*Primary Examiner* — Qing Wu
(74) *Attorney, Agent, or Firm* — Greer, Burns & Crain, Ltd.

(57) ABSTRACT

A virtual machine managing method includes: a dependence relation list generation step of detecting a dependence relation among virtual machines implemented on a physical machine and generating a dependence relation list, based on a detection result; a target management table generation step of reading, when a selection instruction for selecting a target virtual machine to be halted among the plurality of implemented virtual machines is detected; and a halted target presentation step of reading the virtual machine identification information on all of the virtual machines in dependence relation with the target virtual machine to be halted, and visually presenting the read virtual machine identification information on all of the target virtual machines to be halted.

20 Claims, 15 Drawing Sheets

FIG. 4

| PHYSICAL MACHINE | VIRTUAL MACHINES IMPLEMENTED ON PHYSICAL MACHINE |
|---|---|
| PM01 | VM11, VM13, VM15, VM16, VM19 |
| PM02 | VM22, VM23, VM25 |
| PM03 | VM31, VM35, VM37, VM39 |
| PM04 | VM43, VM45, VM46, VM47 |
| PM05 | VM51, VM59 |
| PM06 | VM62, VM65 |

FIG. 6

| REFERENCE SOURCE 42A | REFERENCE DESTINATION 42B |
|---|---|
| VM31 | VM19 |
| VM39 | VM19 |
| VM39 | VM13 |
| VM13 | VM22 |
| VM19 | — |
| VM22 | — |

COMPARISON

FIG. 8

| HALT COMPLETION | HALT ORDER FIRST PLACE (RESUMPTION ORDER THIRD PLACE) | HALT ORDER SECOND PLACE (RESUMPTION ORDER SECOND PLACE) | HALT ORDER THIRD PLACE (RESUMPTION ORDER FIRST PLACE) |
|---|---|---|---|
| ✓ | VM31, VM39 | VM13, VM19 | VM22 |
|  | VM23 | VM25 | VM16 |
|  | VM11, VM15 | VM45 | VM46 |
| ✓ | VM43 | VM51 | VM37, VM47 |
|  | VM59 | VM35 |  |
|  | VM62, VM65 |  |  |

RECORDING MEDIUM RECORDING THEREON VIRTUAL MACHINE MANAGEMENT PROGRAM, MANAGEMENT SERVER DEVICE, AND METHOD FOR MANAGING VIRTUAL MACHINE

CROSS-REFERENCE TO RELATED APPLICATION

This application is based upon and claims the benefit of priority of the prior Japanese Patent Application No. 2008-93079, filed on Mar. 31, 2008 the entire contents of which are incorporated herein by reference.

FIELD

The present invention relates to a virtual machine management program which causes a computer device for causing arbitrary virtual machines among a plurality of virtual machines implemented on a physical machine such as, e.g., a host machine to cooperate with each other to execute a control process to execute a process for managing the plurality of virtual machines, a management server device, and a method for managing a virtual machine.

BACKGROUND

Conventionally, as such a management server device, there has been widely known a technology which manages a physical machine such as, e.g., a host machine and, at the same time, manages a plurality of virtual machines implemented on the physical machine using virtualized software, and allows arbitrary virtual machines among the plurality of virtual machines to cooperate with each other to execute one control process.

In addition, as such a management server device, there has been widely known a technology which stores state information on each virtual machine and executes halt and resumption of the virtual machine (for example Japanese Patent Laid-Open No. 2001-5679).

In accordance with the conventional management server device mentioned above, for example, when a plurality of virtual machines implemented on a physical machine are managed using virtualized software, and a halt instruction is given to one virtual machine among the plurality of virtual machines in cooperation with each other, the virtual machine is halted, and when a resumption process is executed with respect to the halted virtual machine, the halted virtual machine is resumed. However, in the case where a plurality of virtual machines cooperate with each other to execute one control process, even when one virtual machine among the plurality of virtual machines in cooperation with each other is halted, the virtual machines other than the halted virtual machine are still in operation. As a result, even when the halted virtual machine is resumed, there can be considered a situation where consistency can not be secured among the virtual machines in cooperation with each other.

SUMMARY

According to an aspect of the invention, this program is directed to a virtual machine management program which allows a computer device for causing arbitrary virtual machines among a plurality of virtual machines implemented on a physical machine to cooperate with each other to execute a control process to execute a process for managing the plurality of virtual machines, the virtual machine management program allowing the computer device to execute: a dependence relation list generation procedure which detects a dependence relation among the virtual machines implemented on the physical machine and, based on a detection result, generates a dependence relation list table for managing, for each item of virtual machine identification information for identifying each of the virtual machines, the virtual machine identification information on the virtual machine in dependence relation with any of the virtual machines; a target management table generation procedure which reads, when a selection instruction for selecting a target virtual machine to be halted among the plurality of implemented virtual machines is detected, the virtual machine identification information on all of the virtual machines in dependence relation with the target virtual machine to be halted which has been selected by the selection instruction from the dependence relation list table, and generates a target management table for managing the read virtual machine identification information on the target virtual machines to be halted; and a target presentation procedure which reads the virtual machine identification information on all of the virtual machines in dependence relation with the target virtual machine to be halted which has been selected by the selection instruction from the target management table, and visually presents the read virtual machine identification information on all of the target virtual machines to be halted.

The object and advantages of invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is an illustrative view depicting a table content of a virtual machine list table according to the present embodiment.

FIG. 6 is an illustrative view depicting the operation of generating a halt order management table by using the dependence relation list table of the present embodiment.

FIG. 8 is an illustrative view depicting the table content of the halt order management table according to the present embodiment.

DESCRIPTION OF EMBODIMENT

A detailed description will be given hereinbelow of an embodiment of a recording medium recording thereon a virtual machine management program, a management server device, and a method for managing a virtual machine according to the present invention with reference to the drawings. It will be easily appreciated that the technical content of the present embodiment does not limit the technical scope of the invention of the present application.

First, an outline of the present embodiment will be described. The outline of the present embodiment is as follows. Even when, among a plurality of virtual machines implemented on a physical machine, a halt instruction given to one of the plurality of virtual machines is detected, all of the virtual machines in dependence relation with the virtual machine to which the halt instruction is given are visually presented as target virtual machines to be halted. As a result, for example, even when the halt instruction given to one virtual machine among a plurality of virtual machines in cooperation with each other is detected, by visually presenting not only the one virtual machine but also all of the virtual machines in dependence relation with the one virtual machine as target machines to be halted, a user can recognize all of the virtual machines in dependence relation with the target virtual machine to be halted, i.e., the virtual machines in cooperation with each other based on the presentation content and, as a result, it is possible to secure consistency among the virtual machines in cooperation with each other at a time of resumption.

Figure 1:
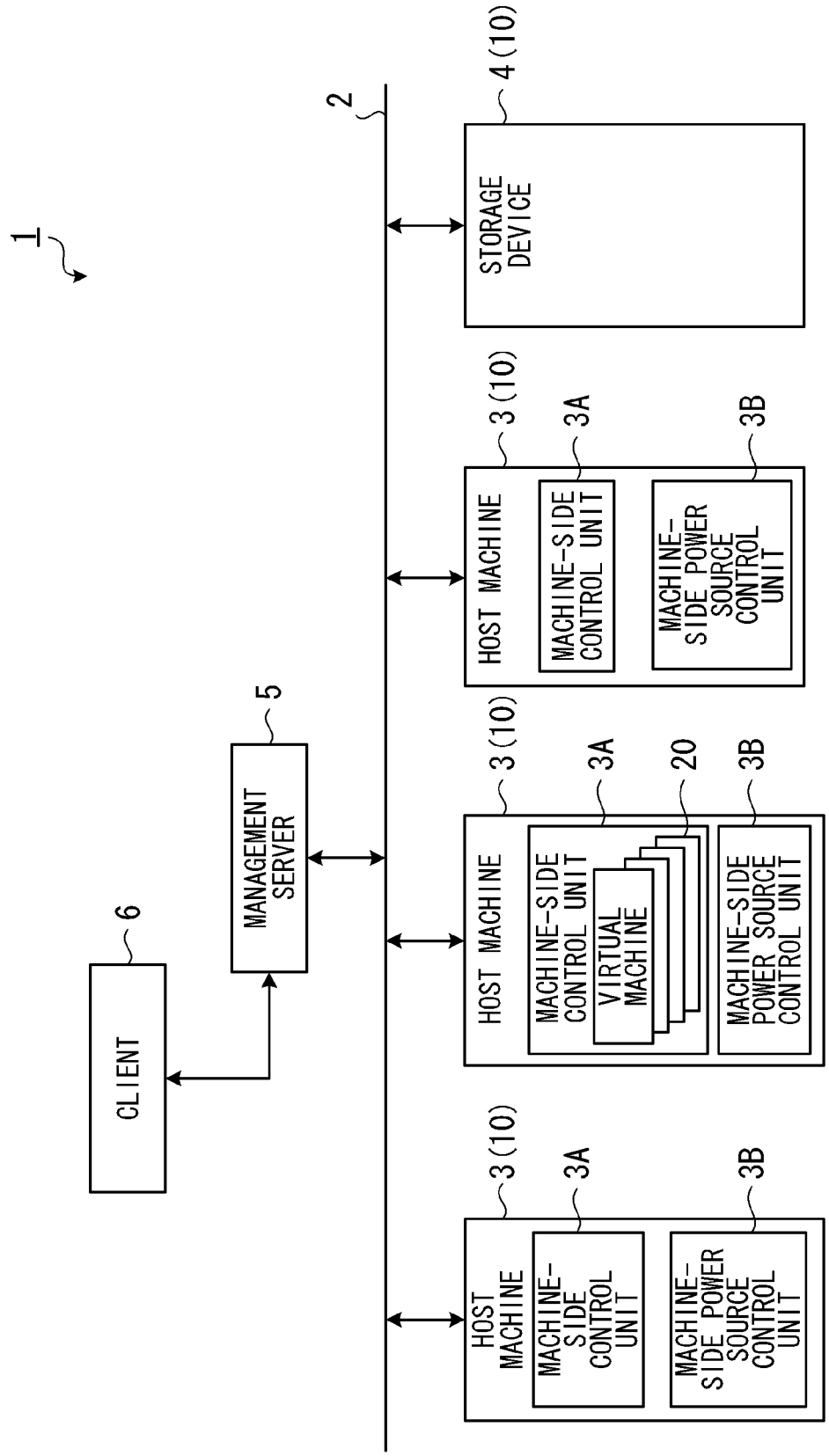
FIG. 1 is a block diagram depicting a schematic structure of an entire virtual machine management system according to the present embodiment.

FIG. 1 is a block diagram depicting a schematic structure of an entire virtual machine management system according to the present embodiment.

A virtual machine management system 1 depicted in FIG. 1 has a management server 5 for managing a plurality of host machines 3 and a storage device 4 via a LAN 2, and a client 6 for operating the management server 5. Each of the plurality of host machines 3 has a machine-side control unit 3A for controlling the entire host machine 3 and a machine-side power source control unit 3B for performing the power source control of the host machine 3.

The host machine 3 implements a plurality of virtual machines 20 on the machine-side control unit 3A using virtualized software, and causes the implemented plurality of virtual machines 20 to cooperate with each other to execute various processes.

The management server 5 manages physical machines 10 such as the host machines 3 and the storage device 4 and, at the same time, manages the plurality of virtual machines 20 implemented on the physical machines 10 using a management tool of the virtualized software.

Figure 2:
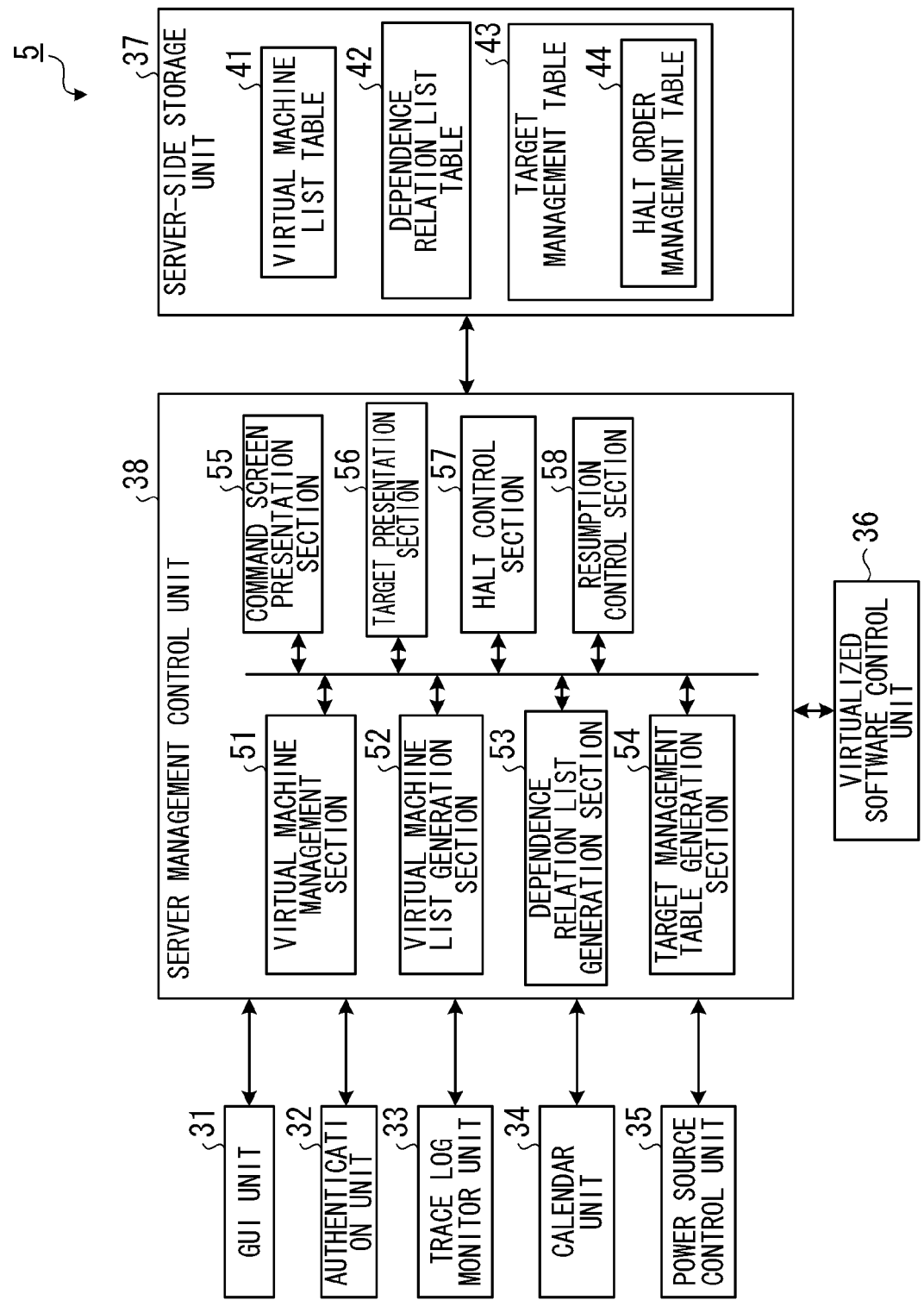
FIG. 2 is a block diagram depicting a schematic internal structure of a management server which is a main portion of the present embodiment.

FIG. 2 is a block diagram depicting a schematic internal structure of the management server 5 according to the present embodiment.

The management server 5 depicted in FIG. 2 has a GUI (Graphical User Interface) unit 31 for managing a user interface with the client 6, an authentication unit 32 for executing an authentication process in cooperation with the management tool of the virtualized software, a trace log monitor unit 33 for managing information collected at a time of occurrence of a failure and an operation log of an audit trail, a calendar unit 34 for managing a calendar function, and a power source control unit 35 for providing a power source operation function related to the management server 5.

In addition, the management server 5 has a virtualized software control unit 36 for monitoring and controlling the plurality of virtual machines 20 implemented on the physical machines 10 using the management tool of the virtualized software, a server-side storage unit 37 for storing various information related to the management server 5, and a server management control unit 38 for controlling the entire management server 5.

The server-side storage unit 37 has a virtual machine list table 41 for managing the virtual machines 20 implemented on the physical machines 10 on a per physical machine 10 basis in list form, a dependence relation list table 42 for managing the dependence relation among the virtual machines 20 in list form, and a target management table 43 for managing a target virtual machine 20 to be managed.

The target management table 43 has a halt order management table 44 for managing a halt order and a resumption order of the plurality of virtual machines 20 in dependence relation with the target virtual machine to be managed.

Although it has been described above that the physical machines 10 and the virtual machines 20 are managed in the virtual machine list table 41, the dependence relation list table 42, the target management table 43, and the halt order management table 44 for the convenience of the description, it will be appreciated that the physical machines 10 and the virtual machines 20 are respectively managed with machine identification information for identifying the physical machines 10 (PM) and machine identification information for identifying the virtual machines 20 (VM).

The server management control unit 38 has a virtual machine management section 51 for managing the virtual machines 20 implemented on the physical machines 10 on a per physical machine 10 basis through the virtualized software control unit 36, a virtual machine list generation section 52 for generating the virtual machine list table 41, a dependence relation list generation section 53 for generating the dependence relation list table 42, and a target management table generation section 54 for generating the halt order management table 44 in the target management table 43.

The virtual machine list generation section 52 collects management information on the virtual machines 20 implemented on the physical machines 10 through the management tool of the virtualized software via the virtualized software control unit 36, and generates the virtual machine list table 41 for managing the virtual machines 20 implemented on the physical machines 10 on a per physical machine 10 basis in list form. The management tool of the virtualized software periodically collects the management information on the virtual machines 20 implemented on the physical machines 10.

Figure 3:
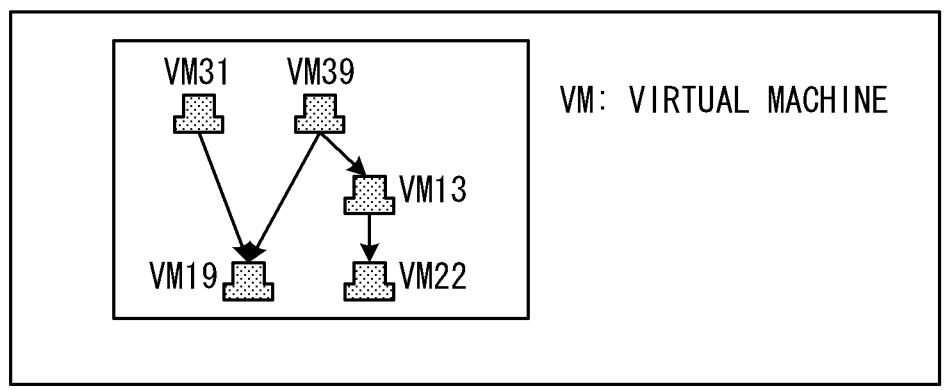
FIG. 3 is an illustrative view depicting an example of a dependence relation among virtual machines implemented on physical machines according to the present embodiment.

FIG. 3 is an illustrative view depicting an example of the dependence relation among the virtual machines 20 implemented on the physical machines 10 according to the present embodiment, while FIG. 4 is an illustrative view depicting a table content of the virtual machine list table 41 according to the present embodiment.

In the example depicted in FIG. 3, five virtual machines 20 indicated by "VM31", "VM39", "VM13", "VM19", and "VM22" are operated in cooperation with each other.

As the dependence relation thereamong, the virtual machine 20 indicated by "VM19" on the physical machine 10 indicated by "PM01" and the virtual machine 20 indicated by "VM22" on the physical machine 10 indicated by "PM02" are not dependent on other virtual machines 20, the virtual machine 20 indicated by "VM39" on the physical machine 10 indicated by "PM03" is dependent on the virtual machines 20 indicated by "VM13" and "VM19", the virtual machine 20 indicated by "VM31" on the physical machine 10 indicated by "PM03" is dependent on the virtual machine 20 indicated by "VM19" on the physical machine 10 indicated by "PM01", and the virtual machine 20 indicated by "VM13" on the physical machine 10 indicated by "PM01" is dependent on the virtual machine 20 indicated by "VM22" on the physical machine 10 indicated by "PM02".

The virtual machine list table 41 depicted in FIG. 4 manages the virtual machines 20 implemented on the physical machines 10 on a per physical machine 10 basis in list form. As a result, based on the table content of the virtual machine list table 41, the server management control unit 38 can recognize, e.g., that five virtual machines 20 indicated by "VM11", "VM13", "VM15", "VM16", and "VM19" are in operation on the physical machine 10 indicated by "PM01", and three virtual machines 20 indicated by "VM22", "VM23", and "VM25"are in operation on the physical machine 10 indicated by "PM02". Four virtual machines 20 indicated by "VM43", "VM45", VM46" and VM47" are in operation on the physical machine 10 indicated by "PM04", two virtual machines 20 indicated by "VM51" and "VM59" are in operation on physical machine 10 indicated by "PM05", and two virtual machines 20 indicated by "VM62" and "VM65" are in operation on the physical machine 10 indicated by "PM06".

The dependence relation list generation section 53 collects connection destination information among the virtual machines 20 through a monitoring function of the virtual machine 20 via the virtualized software control unit 36 and, based on the collected connection state of the virtual machines 20, generates the dependence relation list table 42 for managing the connection destination information among the virtual machines 20 in one-to-one correspondence in list form. The monitoring function of the virtual machine 20 is installed in each virtual machine 20, and periodically examines the connection destination information among the virtual machines 20.

Figure 5:
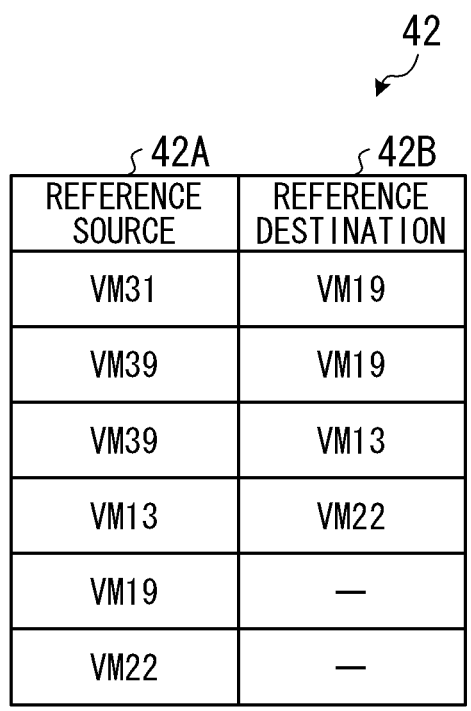
FIG. 5 is an illustrative view depicting a table content of a dependence relation list table according to the present embodiment.

FIG. 5 is an illustrative view depicting a table content of the dependence relation list table 42 according to the present embodiment.

The dependence relation list table 42 depicted in FIG. 5 manages the connection destination information of the virtual machines 20 implemented on each of the physical machines 10 as a reference source 42A and a reference destination 42B in one-to-one correspondence. As a result, as depicted in FIG. 3, between, e.g., the virtual machine 20 indicated by "VM31" and the virtual machine 20 indicated by "VM19", the virtual machine 20 indicated by "VM31" is dependent on the virtual machine 20 indicated by "VM19" so that the virtual machine 20 indicated by "VM31" is determined to be the reference source 42A and the virtual machine 20 indicated by "VM19" is determined to be the reference destination 42B and, between, e.g., the virtual machine 20 indicated by "VM39" and the virtual machine 20 indicated by "VM13", the virtual machine 20 indicated by "VM39" is dependent on the virtual machine 20 indicated by "VM13" so that the virtual machine 20 indicated by "VM39" is determined to be the reference source 42A and the virtual machine 20 indicated by "VM13" is determined to be the reference destination 42B. In this manner, the server management control unit 38 can recognize the dependence relation among the virtual machines 20 based on the table content of the dependence relation list table 42.

Based on the table content of the dependence relation list table 42 depicted in FIG. 5, the target management table generation section 54 generates the halt order management table 44 for managing the halt order of the virtual machines 20 which is a descending order of the dependence relation.

Figure 6:
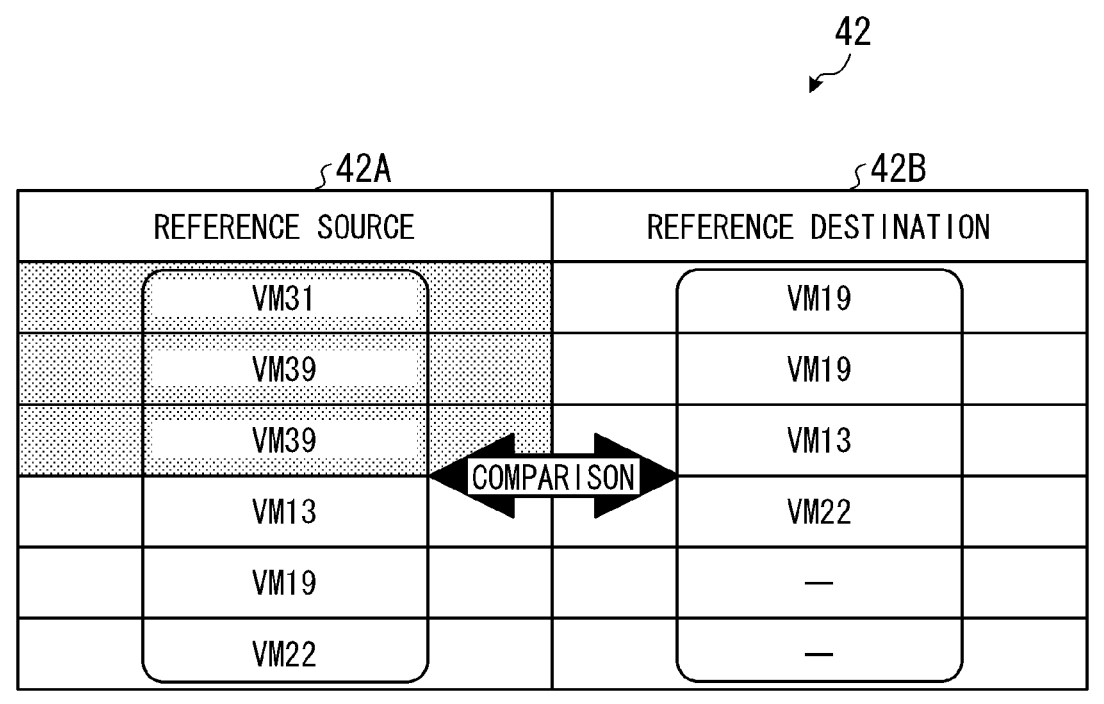
Figure 7:
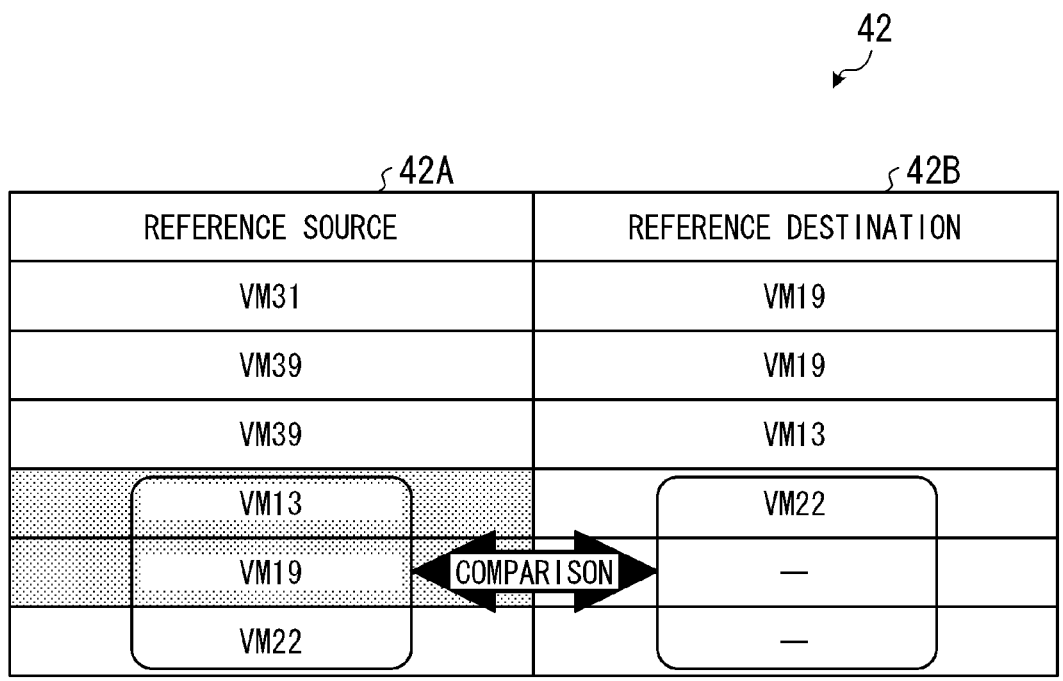
FIG. 7 is an illustrative view depicting the operation of generating a halt order management table by using the dependence relation list table of the present embodiment.

FIGS. 6 and 7 are illustrative views depicting an operation when the halt order management table 44 is generated using the dependence relation list table 42 according to the present embodiment.

The target management table generation section 54 compares a column of the reference source 42A with a column of the reference destination 42B in the dependence relation list table 42, determines, among the virtual machines 20 listed in the column of the reference source 42A, a virtual machine 20 which is not listed in the column of the reference destination 42B as a virtual machine 20 with the highest dependence relation, and sets the virtual machine 20 at the first place in the halt order as the virtual machine 20 to be halted first. In the case depicted in FIG. 6, the target management table generation section 54 sets the virtual machines 20 indicated by "VM31" and "VM39" at the first place.

Next, the target management table generation section 54 compares the column of the reference source 42A with the column of the reference destination 42B except the dependence relation of the virtual machine 20 set at the first place, determines, among the virtual machines 20 listed in the column of the reference source 42A, a virtual machine 20 which is not listed in the column of the reference destination 42B as a virtual machine 20 with a high dependence relation, and sets the virtual machine 20 at the second place in the halt order as the virtual machine 20 to be halted second. In the case depicted in FIG. 7, the target management table generation section 54 sets the virtual machines 20 indicated by "VM13" and "VM19" at the second place.

Moreover, the target management table generation section 54 compares the column of the reference source 42A with the column of the reference destination 42B except the dependence relations of the virtual machines 20 set at the first and second places, determines, among the virtual machines 20 listed in the column of the reference source 42A, a virtual machine 20 which is not listed in the column of the reference destination 42B as a virtual machine 20 with a high dependence relation, and sets the virtual machine 20 at the third place in the halt order as the virtual machine 20 to be halted third. In the case depicted in FIG. 7, the target management table generation section 54 sets the virtual machine 20 indicated by "VM22" at the third place.

In short, the target management table generation section 54 successively compares the column of the reference source 42A with the column of the reference destination 42B except the dependence relations of the virtual machines 20 whose places have been set, generates the halt order of the target to be halted based on the comparison result, and finally generates the halt order management table 44 depicted in FIG. 8.

FIG. 8 is an illustrative view depicting the table content of the halt order management table 44 according to the present embodiment.

The halt order management table 44 depicted in FIG. 8 manages a halt order 44A for each group of the virtual machines 20 in cooperation with each other. For example, for a group in which five virtual machines 20 indicated by "VM31", "VM39", "VM13", "VM19", and "VM22" cooperate with each other, the halt order 44A of the virtual machines 20 indicated by "VM31" and "VM39", the halt order 44A of the virtual machines 20 indicated by "VM13" and "VM19", and the halt order 44A of the virtual machine 20 indicated by "VM22" are managed as the first place, the second place, and the third place, respectively.

For a group of virtual machines 20 which have been halted, the halt order management table 44 checks a halt completion mark box 44B corresponding to the group of the virtual machines 20. As a result, based on the table content in the halt order management table 44, the server management control unit 38 can recognize the halt order of the target virtual machine 20 to be halted and whether or not the target virtual machine 20 to be halted has already been halted.

The server management control unit 38 depicted in FIG. 2 also has a command screen presentation section 55 for presenting a command screen to the client 6 through the GUI unit 31, a target presentation section 56 for visually presenting, when a selection instruction for selecting the target virtual machine 20 to be halted to the virtual machines 20 on the command screen is detected, the halt order of the target virtual machine 20 to be halted and all of the virtual machines 20 in dependence relation with the target virtual machine 20 to be halted to the client 6 through the GUI unit 31, a halt control section 57 for successively halting the virtual machines 20 based on the halt order, and a resumption control section 58 for successively resuming the halted virtual machines 20 based on an order obtained by reversing the halt order, i.e., a resumption order.

It is assumed that the virtual machine management section 51, the virtual machine list generation section 52, the dependence relation list generation section 53, the target management table generation section 54, the command screen presentation section 55, the target presentation section 56, the halt control section 57, and the resumption control section 58 are operated by, e.g., software process on the server management control unit 38.

Figure 11:
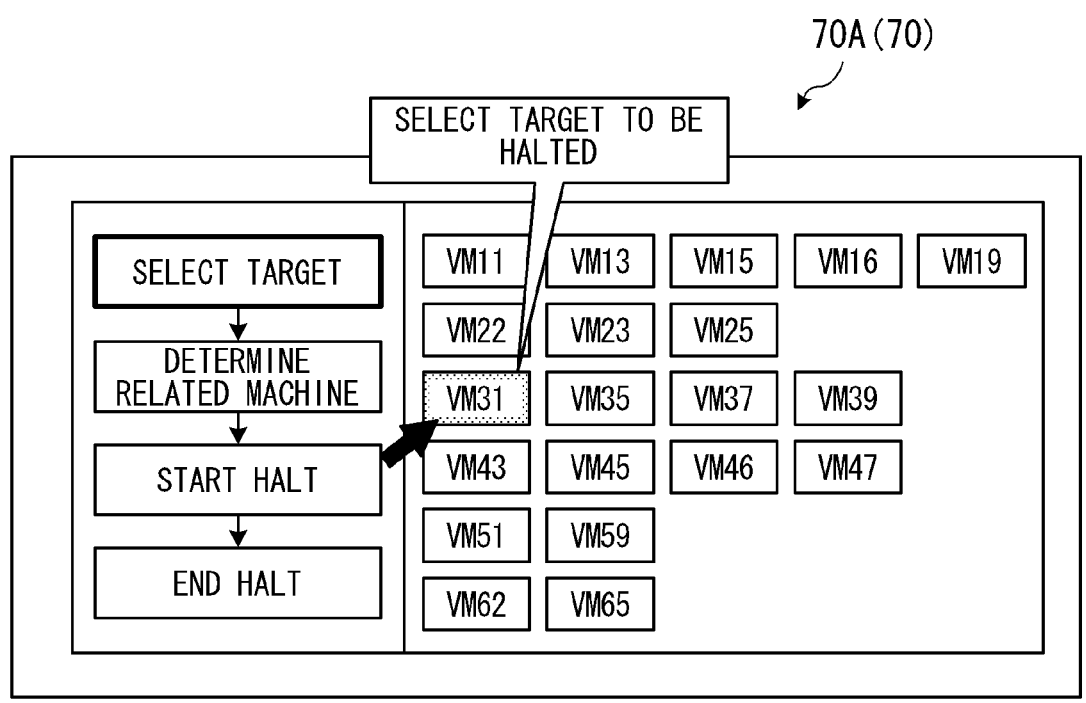
FIG. 11 is an illustrative view depicting a virtual machine halt command screen in the virtual machine halt process presented at a client side according to the present embodiment.
Figure 14:
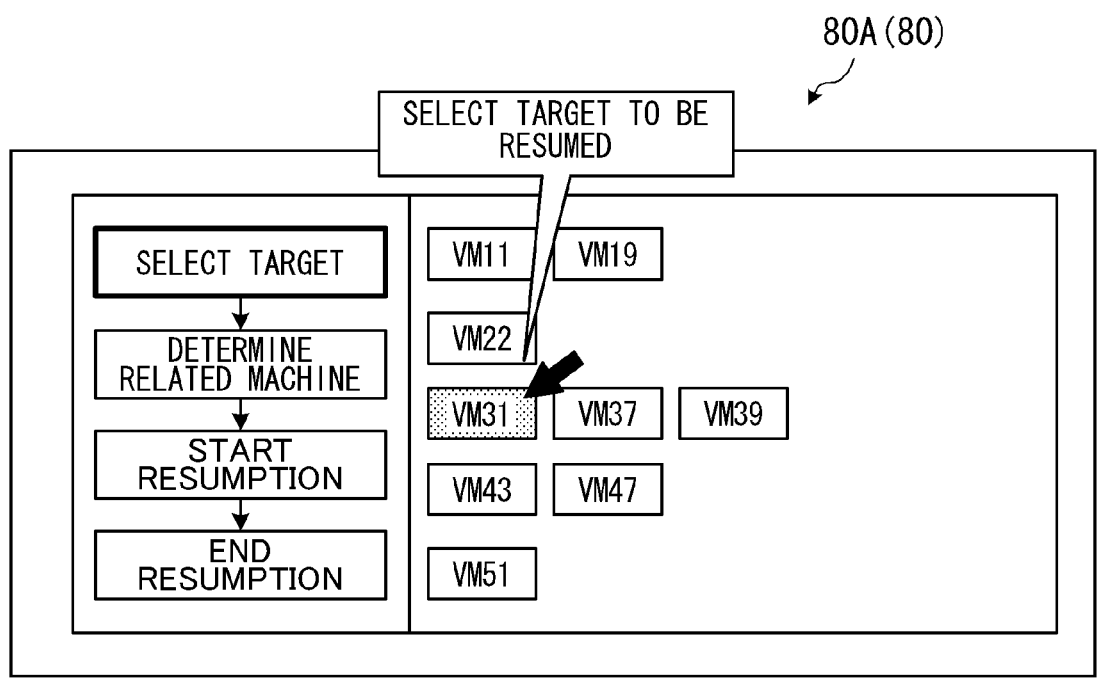
FIG. 14 is an illustrative view depicting a virtual machine resumption command screen in the virtual machine resumption process presented at the client side according to the present embodiment.

When a halt start command from the client 6 is detected through the GUI unit 31, the command screen presentation section 55 presents a virtual machine halt command screen 70 (see FIGS. 11 and 12) to the client 6 and, when a resumption start command from the client 6 is detected through the GUI unit 31, the command screen presentation section 55 presents a virtual machine resumption command screen 80 (see FIGS. 14 and 15) to the client 6.

When the halt order management table 44 related to the target virtual machines 20 to be halted is generated in the target management table generation section 54 in response to the selection instruction for selecting the target virtual machine 20 to be halted on the virtual machine halt command screen 70 through the GUI unit 31, based on the table content of the halt order management table 44, the target presentation section 56 presents the halt order of all of the target virtual machines 20 to be halted (see FIG. 12) to the client 6 on the virtual machine halt command screen 70 through the GUI unit 31.

When the selection instruction for selecting "OK" from the client 6 is detected through the GUI unit 31 during the presentation of the halt order related to the target virtual machines 20 to be halted by the target presentation section 56, based on the halt order, the halt control section 57 successively halts the virtual machines 20 through the virtualized software control unit 36.

In addition, when the halt of the target virtual machines 20 to be halted is completed through the halt control section 57, the target management table generation section 54 checks the halt completion mark box 44B corresponding to the group of all of the target virtual machines 20 to be halted in the halt order management table 44.

When the selection instruction for selecting the target virtual machine 20 to be resumed on the virtual machine resumption command screen 80 is detected through the GUI unit 31, the target presentation section 56 retrieves all of the target virtual machines 20 to be resumed based on the checkmark in the halt completion mark box 44B of the halt order management table 44, and presents an order obtained by reversing the halt order related to all of the target virtual machines 20 to be resumed as the resumption order to the client 6 on the virtual machine resumption command screen 80 (see FIG. 15) through the GUI unit 31.

When the selection instruction for selecting "OK" from the client 6 is detected through the GUI unit 31 during the presentation of the resumption order related to the target virtual machines 20 to be resumed by the target presentation section 56, based on the resumption order, the resumption control section 58 successively resumes the halted virtual machines 20 through the virtualized software control unit 36.

Although the structure of the embodiment has been described thus far, with regard to the correspondence between constituent features in the embodiment and those defined in the appended claims, a computer device and a management server device defined in the appended claims correspond to the management server 5, a physical machine defined in the appended claims corresponds to the host machine 3 or the storage device 4, a virtual machine defined in the appended claims corresponds to the virtual machine 20, a dependence relation list table defined in the appended claims corresponds to the dependence relation list table 42, a dependence relation list generation means defined in the appended claims corresponds to the dependence relation list generation section 53 and the virtualized software control unit 36, a target management table defined in the appended claims corresponds to the halt order management table 44, a target management table generation means defined in the appended claims corresponds to the target management table generation section 54 and the virtualized software control unit 36, a target presentation means defined in the appended claims corresponds to the target presentation section 56, and a halt operation means defined in the appended claims corresponds to the halt control section 57 and the virtualized software control unit 36.

Figure 9:
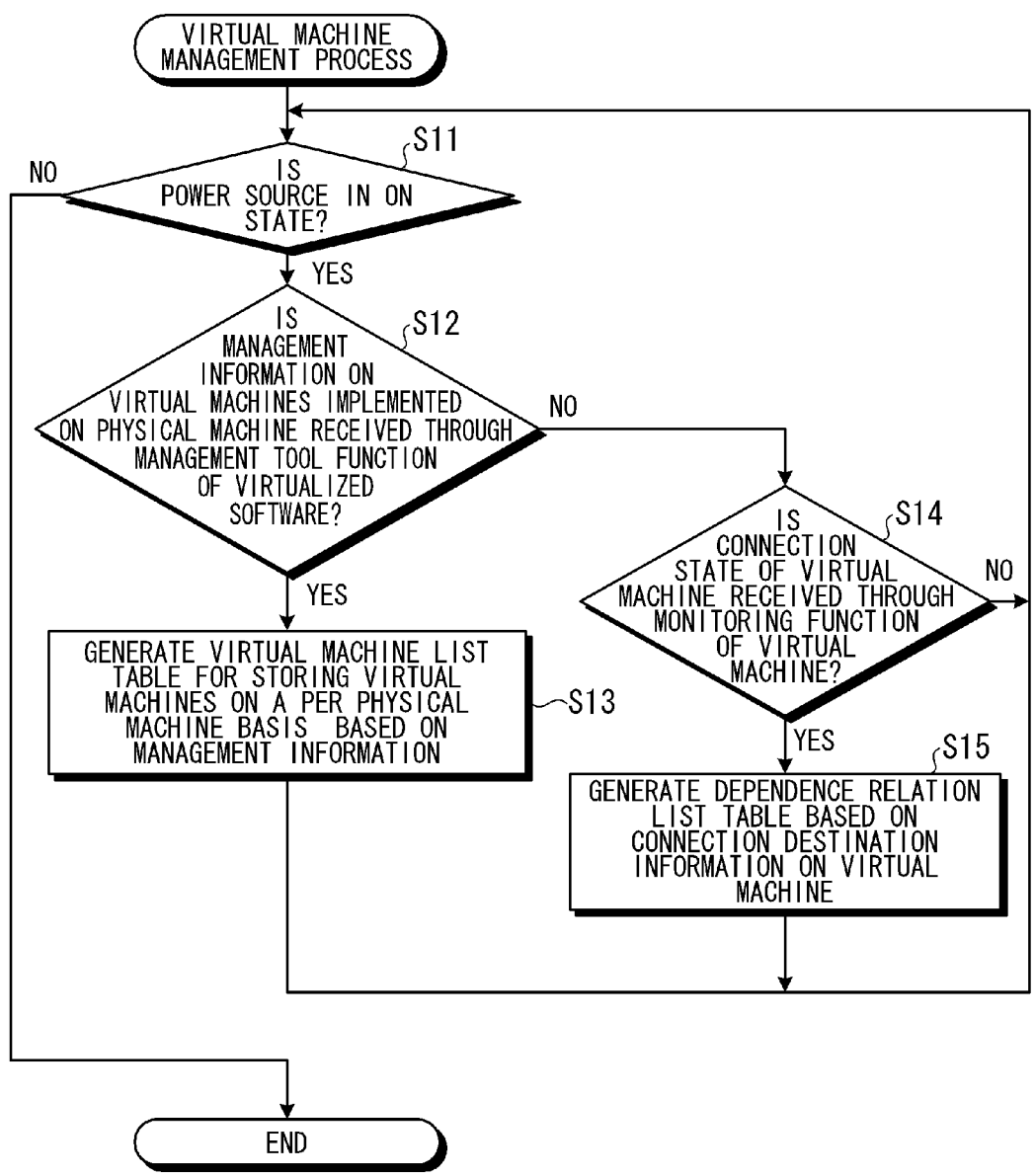
FIG. 9 is a flowchart depicting a process operation of a server management control unit in the management server related to a virtual machine management process according to the present embodiment.

Next, a description will be given of an operation of the virtual machine management system 1 according to the present embodiment. FIG. 9 is a flowchart depicting a process operation of the server management control unit 38 in the management server 5 related to a virtual machine management process according to the present embodiment.

The virtual machine management process depicted in FIG. 9 is a process for generating the virtual machine list table 41 for managing the virtual machines 20 on a per physical machine 10 basis, and the dependence relation list table 42 for managing the dependence relation among the virtual machines 20 based on the connection state of the virtual machines 20.

In FIG. 9, the server management control unit 38 determines whether or not a power source of the management server 5 is in an ON state (Step S11).

When the power source of the management server 5 is in the ON state (Step S11: YES), the server management control unit 38 determines whether or not management information on the virtual machines 20 implemented on each physical machine 10 is received through a management tool function of the virtualized software control unit 36 (Step S12). The management tool function is a function of periodically collecting the management information on the virtual machines 20 implemented on each physical machine 10 using the management tool of the virtualized software.

When the management information on the virtual machines 20 is received (Step S12: YES), based on the management information, the virtual machine list generation section 52 in the server management control unit 38 generates the virtual machine list table 41 for managing a plurality of virtual machines 20 implemented on the physical machines 10 on a per physical machine 10 basis (Step S13), and in order to monitor whether or not the power source of the management server 5 is in the ON state, the process operation moves to Step S11.

When the management information on the virtual machines 20 is not received in Step S12 (Step S12: NO), the server management control unit 38 determines whether or not the connection state of the virtual machines 20 is received through a monitoring function of the virtual machine 20 (Step S14). The monitoring function of the virtual machine 20 is a function of periodically examining the connection state thereof.

When the connection state of the virtual machines 20 is received (Step S14: YES), based on the connection state of the virtual machines 20, the dependence relation list generation section 53 in the server management control unit 38 generates the dependence relation list table 42 for managing the connection destination information on the virtual machines 20 in one-to-one correspondence in list form (Step S15), and in order to monitor whether or not the power source of the management server 5 is in the ON state, the process operation moves to Step S11.

When the connection state of the virtual machines 20 is not received in Step S14 (Step S14: NO), the server management control unit 38 moves the process operation to Step S11.

When the power source of the management server 5 is not in the ON state (Step S11: NO), the server management control unit 38 ends the process operation.

In accordance with the virtual machine management process depicted in FIG. 9, when the management information on the virtual machines 20 implemented on the physical machines 10 is periodically received on a per physical machine 10 basis through the management tool function of the virtualized software control unit 36, the virtual machine list table 41 for managing the virtual machines 20 implemented on the physical machines 10 on a per physical machine 10 basis in list form is generated, and when the connection state of the virtual machines 20 is received through the monitoring function of the virtual machine 20, based on the connection state, the dependence relation list table 42 for managing the dependence relation among the virtual machines 20 by managing the connection destination information on the virtual machines 20 in one-to-one correspondence in list form is generated. As a result, a side with the management server 5 can recognize the virtual machines 20 implemented on each physical machine 10 based on the table content of the virtual machine list table 41, and can also recognize the dependence relation among the individual virtual machines 20 based on the table content of the dependence relation list table 42.

Figure 10:
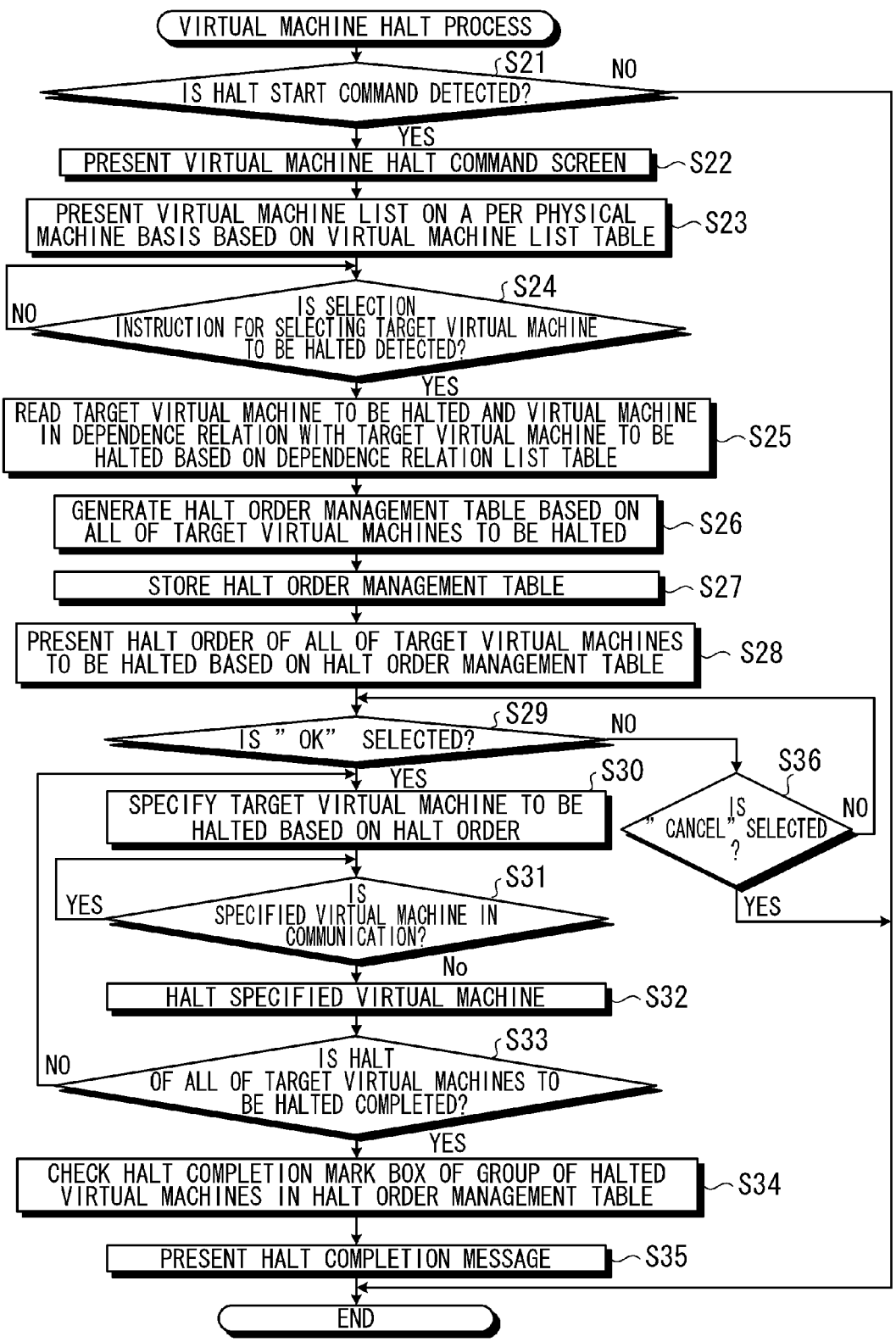
FIG. 10 is a flowchart depicting a process operation of the server management control unit in the management server related to the virtual machine halt process according to the present embodiment.

Next, a description will be given of a virtual machine halt process according to the present embodiment. FIG. 10 is a flowchart depicting a process operation of the server management control unit 38 related to the virtual machine halt process according to the present embodiment.

The virtual machine halt process depicted in FIG. 10 is a process for halting, when the selection instruction for selecting the target virtual machine 20 to be halted among the plurality of virtual machines 20 implemented on each physical machine 10 is detected, not only the target virtual machine 20 to be halted but also all of the virtual machines 20 in dependence relation with the target virtual machine 20 to be halted.

In FIG. 10, the server management control unit 38 determines whether or not the halt start command from the client 6 has been detected through the GUI unit 31 (Step S21).

When the halt start command is detected (Step S21: YES), the command screen presentation section 55 in the server management control unit 38 presents the virtual machine halt command screen 70 depicted in FIG. 11 to the client 6 through the GUI unit 31 (Step S22).

In addition, based on the table content of the virtual machine list table 41, the target presentation section 56 in the server management control unit 38 presents the virtual machines 20 implemented on the physical machines 10 on a per physical machine 10 basis on the virtual machine halt command screen 70 (Step S23). Based on the screen content of a virtual machine halt command screen 70A depicted in FIG. 11, a user on a side with the client 6 can visually recognize the virtual machines 20 implemented on each physical machine 10, i.e., the target virtual machines 20 to be halted.

The server management control unit 38 determines whether or not the selection instruction for selecting the target virtual machine 20 to be halted is detected on the virtual machine halt command screen 70A through the GUI unit 31 (Step S24).

When the selection instruction for selecting the target virtual machine 20 to be halted is detected (Step S24: YES), based on the table content of the dependence relation list table 42, the target management table generation section 54 in the server management control unit 38 reads the target virtual machine 20 to be halted which has been selected by the selection instruction in Step S24, and all of the virtual machines 20 in dependence relation with the target virtual machine 20 to be halted, i.e., all of the target virtual machines 20 to be halted (Step S25).

Based on all of the target virtual machines 20 to be halted which have been read, the target management table generation section 54 generates the halt order management table 44 having descending order of the dependence relation as the halt order (Step S26), and stores, when having generated the halt order management table 44, the halt order management table 44 in the target management table 43 (Step S27).

Figure 12:
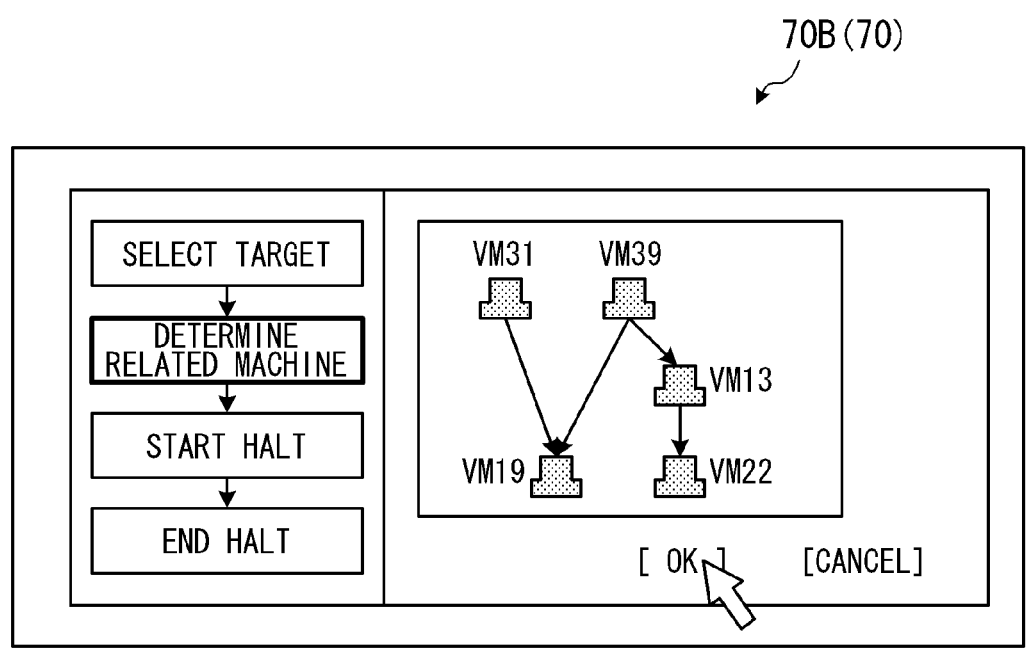
FIG. 12 is an illustrative view depicting the virtual machine halt command screen (halt order screen) in the virtual machine halt process presented at a client side according to the present embodiment.

When the halt order management table 44 is stored in Step S27, based on the table content of the halt order management table 44, the target presentation section 56 in the sever management control unit 38 presents the halt order of all of the target virtual machines 20 to be halted on the virtual machine halt command screen 70 through the GUI unit 31, as depicted in FIG. 12 (Step S28). Based on the screen content of a virtual machine halt command screen 70B depicted in FIG. 12, the user on the side with the client 6 can visually recognize the dependence relation among all of the target virtual machines 20 to be halted.

The server management control unit 38 determines whether or not the selection instruction for selecting "OK" on the virtual machine halt command screen 70B by the client 6 in order to request the execution of the halt of all of the target virtual machines 20 to be halted is detected through the GUI unit 31 (Step S29).

When the selection instruction for selecting "OK" is detected (Step S29: YES), based on the table content of the halt order management table 44, the halt control section 57 in the server management control unit 38 specifies the virtual machine 20 at an upper place among all of the target virtual machines 20 to be halted based on the halt order (Step S30), and determines whether or not the specified virtual machine 20 is in communication (Step S31). A method for determining whether or not the specified virtual machine 20 is in communication determines the connection state through the monitoring function of the virtual machine 20.

When the virtual machine 20 specified in Step S30 is not in communication (Step S31: NO), the halt control section 57 halts the specified virtual machine 20 through the virtualized software control unit 36 (Step S32), and determines whether or not the halt of all of the target virtual machines 20 to be halted is completed (Step S33). The purpose of determining whether or not the virtual machine 20 is in communication in Step S31 is to prevent the situation where the virtual machine 20 is halted despite the virtual machine 20 being in communication and the communication thereof is interrupted.

In the process in Step S32, when a plurality of virtual machines 20 are specified in Step S30, the plurality of virtual machines 20 are simultaneously halted.

When the halt of all of the target virtual machines 20 to be halted is completed (Step S33: YES), the target management table generation section 54 checks the halt completion mark box 44B corresponding to a group of the target virtual machines 20 to be halted in the halt order management table 44 (Step S34).

When the halt completion mark box 44B corresponding to the group of the target virtual machines 20 to be halted is checked, the target presentation section 56 presents a halt completion message indicative of the completion of the halt of all of the target virtual machines 20 to be halted which have been selected by the selection instruction in Step S24 to the client 6 through the GUI unit 31 (Step S35), whereby the process operation is ended. Based on the halt completion message, the user on the side with the client 6 can recognize the completion of the halt of all of the target virtual machines 20 to be halted.

When the halt of all of the target virtual machines 20 to be halted is not completed in Step S33 (Step S33: NO), the halt control section 57 moves the process operation to Step S30 in order to specify the virtual machine 20 at a subsequent place to be halted next based on the halt order.

When the virtual machine 20 specified in Step S31 is in communication (Step S31: YES), the halt control section 57 moves the process operation to Step S31 in order to continuously monitor whether or not the virtual machine 20 is in communication until the communication of the virtual machine 20 is ended.

When the selection instruction for selecting "OK" by the client 6 on the virtual machine halt command screen 70B is not detected in Step S29 (Step S29: NO), the server management control unit 38 determines whether or not a selection instruction for selecting "cancel" on the virtual machine halt command screen 70B is detected (Step S36).

When the selection instruction for selecting "cancel" on the virtual machine halt command screen 70B is detected (Step S36: YES), the server management control unit 38 ends the process operation.

When the selection instruction for selecting "cancel" is not detected in Step S36 (Step S36: NO), the server management control unit 38 moves the process operation to Step S29 in order to determine whether or not the selection instruction for selecting "OK" is detected.

When the halt start command is not detected in Step S21 (Step S21: NO), the server management control unit 38 ends the process operation.

When the selection instruction for selecting the target virtual machine 20 to be halted is not detected in Step S24 (Step S24: NO), the server management control unit 38 continues to perform a monitoring operation in Step S24 in order to monitor the detection of the selection instruction for selecting the target virtual machine 20 to be halted.

In accordance with the virtual machine halt process depicted in FIG. 10, when the selection instruction for selecting the target virtual machine 20 to be halted is detected, based on the dependence relation among the target virtual machine 20 to be halted and all of the virtual machines 20 in dependence relation with the target virtual machine 20 to be halted, i.e., the dependence relation among not only all of the target virtual machines 20 to be halted but also all of the virtual machines 20, the halt order of all of the target virtual machines 20 to be halted is set in descending order of the dependence relation, and the dependence relation among the virtual machines 20 is visually presented to the side with the client 6 based on the set halt order. As a result, because the user on the side with the client 6 can recognize the dependence relation among all of the target virtual machines 20 to be halted on the screen, it is possible to secure consistency among all of the virtual machines 20 in cooperation with each other at a time of resumption of the halted virtual machine 20.

Moreover, in accordance with the virtual machine halt process, the halt order is set in descending order of the dependence relation based on the dependence relation among all of the target virtual machines 20 to be halted, and the virtual machines 20 are successively halted based on the set halt order. That is, the virtual machines 20 are successively halted in descending order of the dependence relation. As a result, an influence to the other virtual machines 20 caused by the halt can be minimally suppressed and, even when a plurality of virtual machines 20 are in the dependence relation, the plurality of virtual machines 20 in the dependence relation can be halted with a simple operation so that it can be intended to reduce an operational time required for the halt and significantly reduce an operational burden thereof.

Furthermore, in accordance with the virtual machine halt process, the virtual machines are successively halted in descending order of the dependence relation based on the set halt order and, when the halt of all of the target virtual machines 20 to be halted is completed, the halt completion mark box 44B corresponding to the group of the target virtual machines 20 to be halted in the halt order management table is checked. As a result, based on the checkmark in the halt completion mark box 44B, the halted virtual machines 20 can be recognized.

Figure 13:
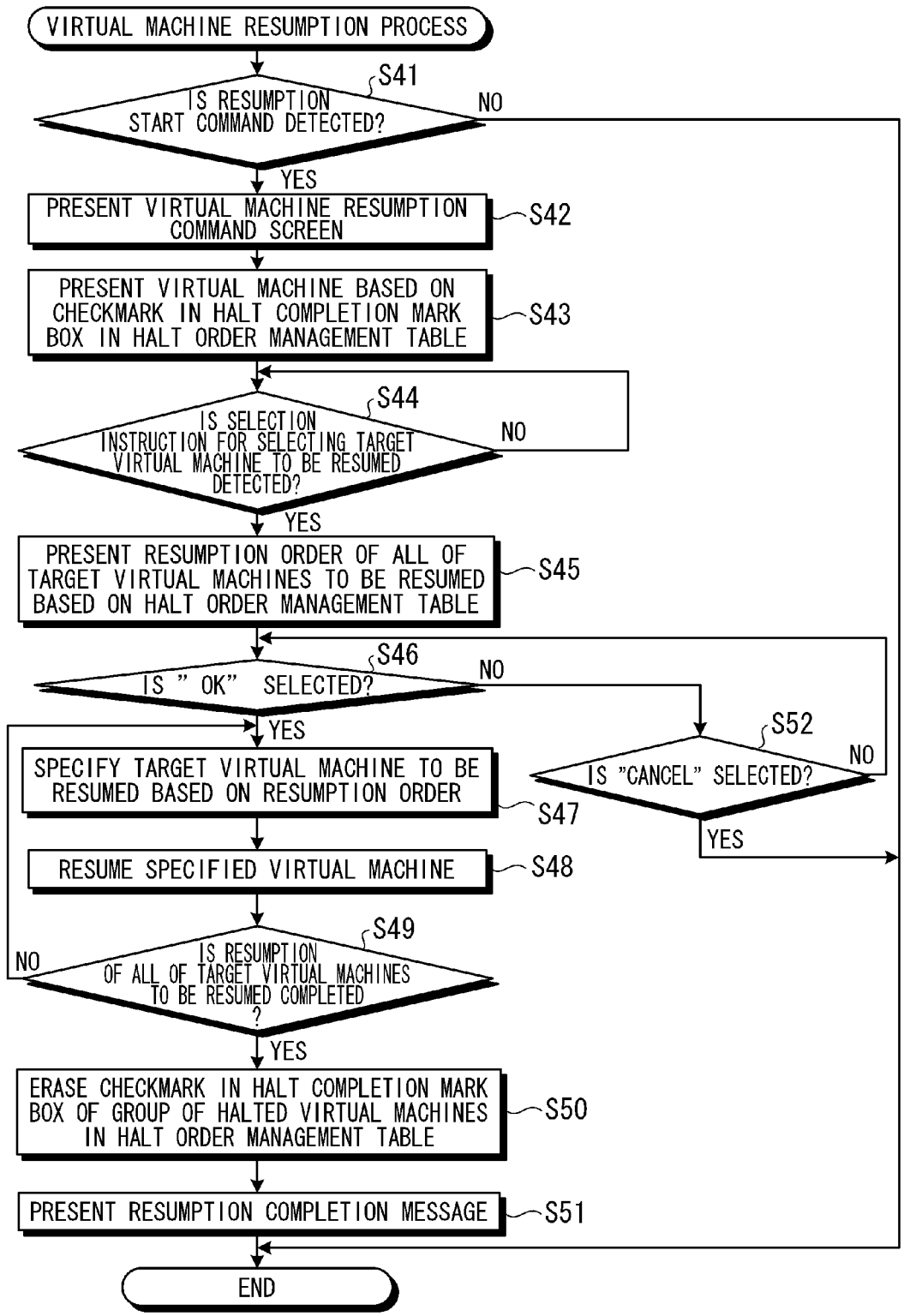
FIG. 13 is a flowchart depicting a process operation of the server management control unit in the management server related to a virtual machine resumption process according to the present embodiment.

Next, a description will be given of a virtual machine resumption process according to the present embodiment. FIG. 13 is a flowchart depicting a process operation of the server management control unit 38 related to the virtual machine resumption process according to the present embodiment.

The virtual machine resumption process depicted in FIG. 13 is a process for resuming, when a resumption instruction for resuming the target virtual machine 20 to be resumed among a plurality of halted virtual machines 20 is detected, not only the target virtual machine 20 to be resumed but also all of the virtual machines 20 in dependence relation with the target virtual machine 20 to be resumed.

In FIG. 13, the server management control unit 38 determines whether or not the resumption start command from the client 6 is detected through the GUI unit 31 (Step S41).

When the resumption start command is detected (Step S41: YES), the command screen presentation section 55 presents the virtual machine resumption command screen 80 depicted in FIG. 14 to the client 6 through the GUI unit 31 (Step S42).

Based on the checkmark in the halt completion mark box 44B in the halt order management table 44, the target presentation section 56 presents the halted virtual machines 20 on the virtual machine resumption command screen 80 (Step S43). Based on the screen content of a virtual machine resumption command screen 80A depicted in FIG. 14, the user on the side with the client 6 can visually recognize the halted virtual machines 20, i.e., the target virtual machines 20 to be resumed.

The server management control unit 38 determines whether or not the selection instruction for selecting the target virtual machine 20 to be resumed on the virtual machine resumption command screen 80A is detected through the GUI unit 31 (Step S44).

Figure 15:
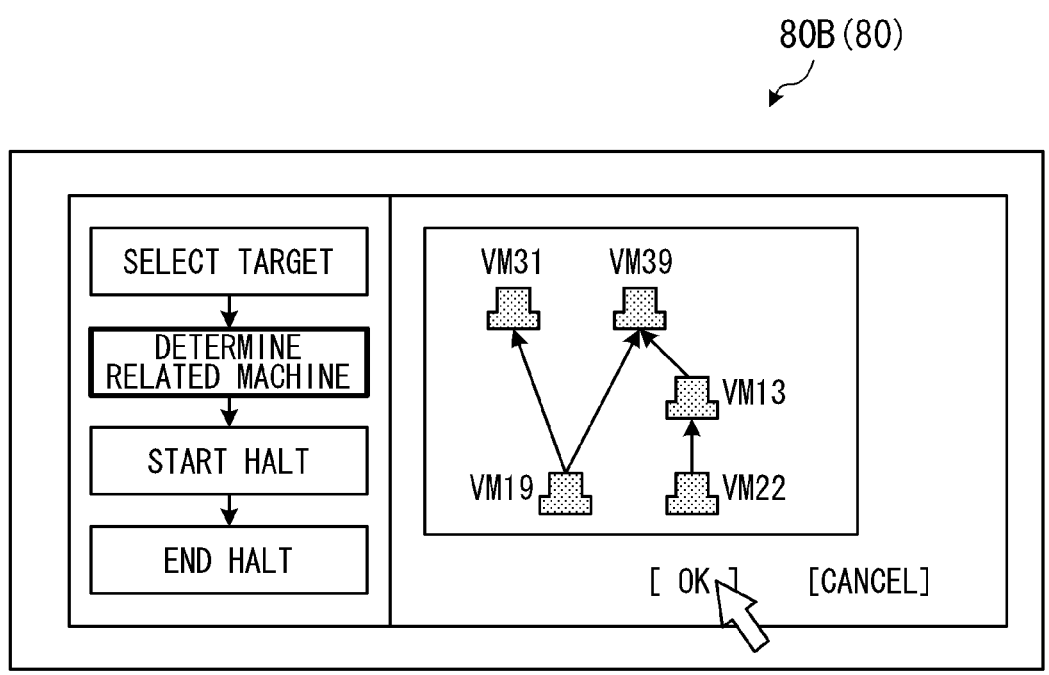
FIG. 15 is an illustrative view depicting the virtual machine resumption command screen (resumption order screen) in the virtual machine resumption process presented at the client side according to the present embodiment.

Based on the table content of the halt order management table 44, the target presentation section 56 sets an order obtained by reversing the halt order of all of the target virtual machines 20 to be resumed as the resumption order which is ascending order of the dependence relation, and presents the resumption order of all of the target virtual machines 20 to be resumed on the virtual machine resumption command screen 80 through the GUI unit 31, as depicted in FIG. 15 (Step S45). Based on the screen content of a virtual machine resumption command screen 80B depicted in FIG. 15, the user on the side with the client 6 can visually recognize the dependence relation among all of the target virtual machines 20 to be resumed.

The server management control unit 38 determines whether or not the selection instruction for selecting "OK" on the virtual machine resumption command screen 80B by the client 6 in order to request the execution of the resumption of all of the target virtual machines 20 to be resumed is detected through the GUI unit 31 (Step S46).

When the selection instruction for selecting "OK" is detected (Step S46: YES), based on the table content of the halt order management table 44, the resumption control section 58 specifies a virtual machine 20 at an upper place among all of the target virtual machines 20 to be resumed based on the resumption order (Step S47), and resumes the virtual machine 20 through the virtualized software control unit 36 (Step S48). With regard to the resumption in Step S48, when a plurality of virtual machines 20 are specified in Step S47, the plurality of virtual machines 20 are simultaneously resumed.

When the target virtual machine 20 to be resumed specified in Step S47 is resumed, the resumption control section 58 determines whether or not the resumption of all of the target virtual machines 20 to be resumed is completed (Step S49).

When the resumption of all of the target virtual machines 20 to be resumed is completed (Step S49: YES), the target management table generation section 54 erases the checkmark in the halt completion mark box 44B corresponding to the group of the target virtual machines 20 to be resumed in the halt order management table 44 (Step S50).

When the checkmark in the halt completion mark box 44B related to the target virtual machines 20 to be resumed is erased, the target presentation section 56 presents a resumption completion message indicative of the completion of the resumption of all of the target virtual machines 20 to be resumed which have been selected by the selection instruction in Step S44 to the client 6 through the GUI unit 31 (Step S51), whereby the process operation is ended. Based on the resumption completion message, the user on the side with the client 6 can recognize the completion of the resumption of all of the target virtual machines 20 to be resumed.

When the resumption of all of the target virtual machines 20 to be resumed is not completed in Step S49 (Step S49: NO), the resumption control section 58 moves the process operation to Step S47 in order to specify a virtual machine 20 at a subsequent place to be resumed next based on the resumption order.

When the selection instruction for selecting "OK" on the virtual machine resumption command screen 80B by the client 6 is not detected in Step S46 (Step S46: NO), the server management control unit 38 determines whether or not the selection instruction for selecting "cancel" on the virtual machine resumption command screen 80B is detected (Step S52).

When the selection instruction for selecting "cancel" on the virtual machine resumption command screen 80B is detected (Step S52: YES), the server management control unit 38 ends the process operation.

When the selection instruction for selecting "cancel" is not detected in Step S52 (Step S52: NO), the server management control unit 38 moves the process operation to Step S46 in order to determine whether or not the selection instruction for selecting "OK" is detected.

When the resumption start command is not detected in Step S41 (Step S41: NO), the server management control unit 38 ends the process operation.

When the selection instruction for selecting the target virtual machine 20 to be resumed is not detected in Step S44 (Step S44: NO), the server management control unit 38 continues to perform the monitoring operation in Step S44 in order to monitor the detection of the selection instruction for selecting the target virtual machine 20 to be resumed.

In accordance with the virtual machine resumption process depicted in FIG. 13, when the resumption instruction for resuming the target virtual machine 20 to be resumed among a plurality of halted virtual machines 20 is detected, based on the dependence relation among the target virtual machine 20 to be resumed and all of the virtual machines 20 in dependence relation with the target virtual machine 20 to be resumed, i.e., the dependence relation among not only all of the target virtual machines 20 to be resumed but also all of the virtual machines 20, the resumption order of all of the target virtual machines 20 to be resumed is set in ascending order of the dependence relation, and the dependence relation among the virtual machines 20 is visually presented to the side with the client 6 based on the set resumption order. As a result, because the user on the side with the client 6 can recognize the dependence relation among all of the target virtual machines 20 to be resumed on the screen, it is possible to secure consistency among all of the virtual machines 20 in cooperation with each other at the time of the resumption.

Moreover, in accordance with the virtual machine resumption process, the resumption order is set in ascending order of the dependence relation based on the dependence relation among all of the target virtual machines 20 to be resumed, and the virtual machines 20 are successively resumed based on the set resumption order. That is, the virtual machines 20 are successively resumed in ascending order of the dependence relation. As a result, an influence to the other virtual machines 20 caused by the resumption can be minimally suppressed and, even when a plurality of virtual machines 20 are in the dependence relation, the plurality of virtual machines 20 in the dependence relation can be resumed with a simple operation so that it can reduce an operational time required for the resumption and significantly reduce an operational burden thereof.

In accordance with the present embodiment, the dependence relation among the virtual machines 20 implemented on the physical machines 10 is detected and, based on the detection result, the dependence relation list table 42 for managing, for each virtual machine 20, the virtual machines 20 in dependence relation with the virtual machine 20 is generated. When the selection instruction for selecting the target virtual machine 20 to be halted among a plurality of implemented virtual machines 20 is detected, all of the virtual machines 20 in dependence relation with the target virtual machine 20 to be halted selected by the selection instruction are visually presented in the halt order, i.e., in descending order of the dependence relation. As a result, for example, even when a halt instruction to one virtual machine 20 among a plurality of virtual machines 20 in cooperation with each other is detected, not only the one virtual machine 20 but also all of the virtual machines 20 in dependence relation with the one virtual machine 20 are visually presented as the target to be halted, whereby the user can recognize the target virtual machines 20 to be halted based on the presentation content, and consistency among the virtual machines 20 in cooperation with each other can be secured at the time of resumption.

Additionally, in accordance with the present embodiment, when the selection instruction for selecting "OK" is detected during the presentation of the halt order indicative of the dependence relation among all of the target virtual machines 20 to be halted, the virtual machines 20 are successively halted in descending order of the dependence relation based on the halt order. As a result, an influence caused by the halt of the virtual machines 20 in the dependence relation can be minimally suppressed and, at the same time, all of the target virtual machines 20 to be halted can be successively halted with a simple operation so that it can be intended to reduce an operational time required for the halt and, at the same time, significantly reduce an operational burden thereof.

Moreover, in accordance with the present embodiment, when the selection instruction for selecting the target virtual machine 20 to be resumed among a plurality of halted virtual machines 20 is detected, all of the virtual machines 20 in dependence relation with the target virtual machine 20 to be resumed selected by the selection instruction are visually presented in the resumption order, i.e., in ascending order of the dependence relation. As a result, based on the presentation content, the user can recognize the target virtual machines 20 to be resumed and consistency among the virtual machines 20 in cooperation with each other can be secured at the time of resumption.

Furthermore, in accordance with the present embodiment, when the selection instruction for selecting "OK" is detected during the presentation of the resumption order indicative of the dependence relation among all of the target virtual machines 20 to be resumed, based on the resumption order, the virtual machines 20 are successively resumed in ascending order of the dependence relation. As a result, an influence caused by the resumption of the virtual machines 20 in the dependence relation can be minimally suppressed and, at the same time, all of the target virtual machines 20 to be resumed can be successively resumed with a simple operation, to reduce an operational time required for the resumption and, at the same time, significantly reduce an operational burden thereof.

In the present embodiment, when the selection instruction for selecting "OK" is detected during the presentation of the halt order indicative of the dependence relation among all of the target virtual machines 20 to be halted based on the table content of the halt order management table 44, all of the target virtual machines 20 to be halted are successively halted automatically based on the halt order and, when the selection instruction for selecting "OK" is detected during the presentation of the resumption order indicative of the dependence relation among all of the target virtual machines 20 to be resumed, all of the target virtual machines 20 to be resumed are successively resumed automatically based on the resumption order. However, it will be appreciated that the successive halt of the target virtual machines 20 to be halted or the successive resumption of the target virtual machines 20 to be resumed may be manually executed without executing the automatic halt operation or the automatic resumption operation.

In addition, in the present embodiment, a description has been given by taking, as an example, the virtual machine management system 1 in which a plurality of virtual machines 20 implemented on a plurality of physical machines 10 cooperate with each other. However, it will be appreciated that a similar effect can be obtained by a system in which the plurality of virtual machines 20 implemented on one physical machine 10 cooperate with each other.

Moreover, in the present embodiment, after all of the target virtual machines 20 to be halted are successively halted through the halt control section 57, all of the target virtual machines 20 to be resumed are successively resumed through the resumption control section 58. However, it will be appreciated that a similar effect can be obtained even in the case where, when all of the target virtual machines 20 to be halted are successively halted through the halt control section 57, a snapshot process for successively halting the virtual machines 20 after having stored the states of the virtual machines 20 immediately before the halting operation is executed and, when all of the target virtual machines 20 to be resumed are successively resumed through the resumption control section 58, a revert process for successively resuming the virtual machines 20 which are halted with the states thereof immediately before the halting operation being stored is executed.

The embodiment of the present invention has been described thus far. However, it will be appreciated that the scope of the technical concept of the present invention is not limited by the present embodiment and various embodiments may be implemented without departing from the scope of the technical concept as defined in the appended claims. In addition, the effect described in the present embodiment is not limited thereto.

In addition, of the processes described in the present embodiment, all or part of the processes explained as being performed automatically can be performed manually. Conversely, all or part of the processes explained as being performed manually can be performed automatically by a known method. Processing procedures, control procedures, specific names, and information including various data and parameters explained in the present embodiment can be changed as required unless otherwise specified.

Moreover, the respective constituent elements of the respective devices depicted in the drawings need not be physically configured as illustrated. Specific forms of distribution and integration of the respective devices are not limited to those depicted in the drawings.

Furthermore, the whole or an optional part of the respective process functions executed by the respective devices may be executed on a CPU (Central Processing Unit) (or a microcomputer such as a MPU (Micro Processing Unit), a MCU (Micro Controller Unit), or the like), on a program that is analyzed and executed by the CPU (or the microcomputer such as the MPU, the MCU, or the like), or on hardware by a wired logic.

What is claimed is:

1. A computer-readable, non transitory recording medium storing a virtual machine management program which causes a computer device for causing arbitrary virtual machines among a plurality of virtual machines implemented on a physical machine to cooperate with each other to execute a control process to execute a process for managing the plurality of virtual machines, wherein the virtual machine management program causes the computer device to execute:
    a dependence relation list generation procedure which detects a dependence relation among the virtual machines implemented on the physical machine and, based on a result of the detection result, generates a dependence relation list table for managing, for each item of virtual machine identification information for identifying each of the virtual machines, the virtual machine identification information on the virtual machine in dependence relation with any of the virtual machines;
    a target management table generation procedure which reads, when a selection instruction for selecting a target virtual machine to be halted among the plurality of implemented virtual machines is detected, the virtual machine identification information on all virtual machines in dependence relation with the target virtual machine to be halted which have been selected by the selection instruction from the dependence relation list table, and generates a target management table for managing read virtual machine identification information; and
    a target presentation procedure which reads the virtual machine identification information from the target management table, and visually presents the read virtual machine identification information as identification information of a target virtual machine to be halted.

2. The computer-readable recording medium storing the virtual machine management program of claim 1, wherein, when the virtual machine identification information on all of the target virtual machines to be halted is visually presented, the target presentation procedure visually presents the virtual machine identification information on all of the target virtual machines to be halted based on a halt order with which the virtual machines among all of the target virtual machines to be halted are successively halted in descending order of the dependence relation.

3. The computer-readable recording medium storing the virtual machine management program of claim 2, wherein the virtual machine management program causes the computer device to further execute:
    a halt operation procedure which successively halts the virtual machines among all of the target virtual machines to be halted in descending order of the dependence relation based on the halt order when a start instruction for starting a halt operation is detected during the presentation of the virtual machine identification information on all of the target virtual machines to be halted in the target presentation procedure.

4. The computer-readable recording medium storing the virtual machine management program of claim 3, wherein, when a halt of all of the target virtual machines to be halted is completed through the halt operation procedure, the target management table generation procedure checks a halt completion mark box in the target management table corresponding to the virtual machine identification information on the target virtual machines to be halted.

5. The computer-readable recording medium storing the virtual machine management program of claim 3, wherein, when a selection instruction for selecting a target virtual machine to be resumed among the halted virtual machines is detected, the target presentation procedure reads the virtual machine identification information on all virtual machines in dependence relation with the target virtual machine to be resumed which have been selected by the selection instruction from the target management table, and visually presents the read virtual machine identification information on all of the target virtual machines to be resumed.

6. The computer-readable recording medium storing the virtual machine management program of claim 5, wherein
    when the virtual machine identification information on all of the target virtual machines to be resumed is visually presented, the target presentation procedure visually presents the virtual machine identification information on all of the target virtual machines to be resumed based on a resumption order with which, among all of the target halted virtual machines to be resumed, the halted virtual machines are successively resumed in ascending order of the dependence relation, and
    the virtual machine management program causes the computer device to execute a resumption operation procedure which successively resumes, when a start instruction for starting a resumption operation is detected during the presentation of the virtual machine identification information on all of the target virtual machines to be resumed, the halted virtual machines among all of the target virtual machines to be resumed in ascending order of the dependence relation based on the resumption order.

7. The computer-readable recording medium storing the virtual machine management program of claim 6, wherein, when a resumption of all of the target virtual machines to be resumed is completed through the resumption operation procedure, the target management table generation procedure erases a checkmark in a halt completion mark box in the target management table corresponding to the virtual machine identification information on the target virtual machines to be resumed.

8. The computer-readable recording medium storing the virtual machine management program of claim 1, wherein the virtual machine management program causes the computer device to further execute:
    a virtual machine list generation procedure which detects the virtual machines implemented on the physical machine and, based on the detection result, generates a virtual machine list table for managing the virtual machine identification information on the virtual machines implemented on the physical machine for each item of physical machine identification information for identifying the physical machine, and
    the target management table generation procedure detects, based on a table content of the virtual machine list table generated in the virtual machine list generation procedure, the selection instruction for selecting the target virtual machine to be halted among the plurality of virtual machines implemented on a per physical machine basis.

9. The computer-readable recording medium storing the virtual machine management program of claim 3, wherein the halt operation procedure stores, among all of the target virtual machine to be halted, present states of the target virtual machines as states thereof immediately before a halt in descending order of the dependence relation, and then successively halts the virtual machines.

10. The computer-readable recording medium storing the virtual machine management program of claim 6, wherein
the halt operation procedure stores, among all of the target virtual machines to be halted, present states of the virtual machines as states thereof immediately before a halt in descending order of the dependence relation, and then successively halts the virtual machines, and
the resumption operation procedure successively resumes, among all of the target virtual machines to be resumed, the halted virtual machines with the states thereof immediately before the halt being stored in ascending order of the dependence relation.

11. A management server device that manages a physical machine, manages a plurality of virtual machines implemented on the physical machine, and enables arbitrary virtual machines among the plurality of virtual machines to cooperate with each other and to execute a control process, the management server device comprising:
a processor that executes a procedure using a storage device, the procedure including:
detecting a dependence relation among the virtual machines implemented on the physical machine based on a result of the detection;
generating, from the storage device, a dependence relation list table for managing, for each item of virtual machine identification information for identifying each of the virtual machines, the virtual machine identification information on the virtual machine in dependence relation with any of the virtual machines;
reading, when a selection instruction for selecting a target virtual machine to be halted among the plurality of implemented virtual machines is detected, the virtual machine identification information on all virtual machines in dependence relation with the target virtual machine to be halted which has been selected by the selection instruction from the dependence relation list table;
generating a target management table for managing read virtual machine identification information on the target virtual machines to be halted;
reading the virtual machine identification information on all of the virtual machines in dependence relation with the target virtual machine to be halted which have been selected by the selection instruction from the target management table; and
visually presenting the read virtual machine identification information on all of the target virtual machines to be halted.

12. The management server device according to claim 11, wherein, when the virtual machine identification information on all of the target virtual machines to be halted is visually presented, the processor visually presents the virtual machine identification information on all of the target virtual machines to be halted based on a halt order with which the virtual machines among all of the target virtual machines to be halted are successively halted in descending order of the dependence relation.

13. The management server device according to claim 12, wherein the procedure further includes:
successively halting the virtual machines among all of the target virtual machines to be halted in descending order of the dependence relation based on the halt order when a start instruction for starting a halt operation is detected during the presentation of the virtual machine identification information on all of the target virtual machines to be halted.

14. The management server device according to claim 13, wherein, when a halt of all of the target virtual machines to be halted is completed, the processor checks a halt completion mark box in the target management table corresponding to the virtual machine identification information on the target virtual machines to be halted.

15. The management server device according to claim 13, wherein, when a selection instruction for selecting a target virtual machine to be resumed among the halted virtual machines is detected, the processor reads the virtual machine identification information on all of virtual machines in dependence relation with the target virtual machine to be resumed which has been selected by the selection instruction from the target management table, and visually presents the read virtual machine identification information on all of the target virtual machines to be resumed.

16. The management server device according to claim 15, wherein
when the virtual machine identification information on all of the target virtual machines to be resumed is visually presented, the processor visually presents the virtual machine identification information on all of the target virtual machines to be resumed based on a resumption order with which, among all of the target halted virtual machines to be resumed, the halted virtual machines are successively resumed in ascending order of the dependence relation.

17. The management server device according to claim 16, wherein the procedure further includes:
successively resuming, when a start instruction for starting a resumption operation is detected during the presentation of the virtual machine identification information on all of the target virtual machines to be resumed, the halted virtual machines among all of the target virtual machines to be halted in ascending order of the dependence relation based on the resumption order.

18. The management server device according to claim 11, wherein the procedure includes:
detecting the virtual machines implemented on the physical machine and, based on the detection result;
generating a virtual machine list table for managing the virtual machine identification information on the virtual machines implemented on the physical machine for each item of physical machine identification information for identifying the physical machine, and
wherein the processor detects, based on a table content of the virtual machine list table, the selection instruction for selecting the target virtual machine to be halted among the plurality of virtual machines implemented on a per physical machine basis.

19. A virtual machine managing method for managing a plurality of virtual machines implemented on a physical machine by enabling arbitrary virtual machines among the plurality of virtual machines to cooperate with each other and to execute a control process, the method comprising:
detecting a dependence relation among the virtual machines implemented on the physical machine and generating, based on a detection result, a dependence relation list table for managing virtual machine identification information on the virtual machine in dependence relation with any of the virtual machines for each item of virtual machine identification information for identifying each of the virtual machines;

reading, when a selection instruction for selecting a target virtual machine to be halted among the plurality of implemented virtual machines is detected, the virtual machine identification information on all virtual machines in dependence relation with the target virtual machine to be halted which has been selected by the selection instruction from the dependence relation list table, and generating a target management table for managing the read virtual machine identification information on the target virtual machines to be halted; and reading the virtual machine identification information on all of the virtual machines in dependence relation with the target virtual machine to be halted which have been selected by the selection instruction from the target management table, and visually presenting the read virtual machine identification information on all of the target virtual machines to be halted.

20. The virtual machine managing method according to claim 19, further comprising: a resumed target presentation step of reading, when a selection instruction for selecting a target virtual machine to be resumed among the halted virtual machines is detected, the virtual machine identification information on all virtual machines in dependence relation with the target virtual machine to be resumed which have been selected by the selection instruction from the target management table, and visually presenting the read virtual machine identification information on all of the target virtual machines to be resumed.

* * * * *